(12) United States Patent
Ohno

(10) Patent No.: US 7,072,073 B2
(45) Date of Patent: Jul. 4, 2006

(54) IMAGE PROCESSING DEVICE AND METHOD, IMAGE FORMING DEVICE AND METHOD, AND INFORMATION PROCESSING DEVICE AND METHOD

(75) Inventor: Takashi Ohno, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 940 days.

(21) Appl. No.: 10/015,748

(22) Filed: Dec. 17, 2001

(65) Prior Publication Data

US 2002/0093671 A1     Jul. 18, 2002

(30) Foreign Application Priority Data

Jan. 17, 2001   (JP)   .............................. 2001-009127

(51) Int. Cl.
*H04N 1/56*   (2006.01)

(52) U.S. Cl. ...................... 358/1.9; 358/3.21; 358/521

(58) Field of Classification Search ................. 358/1.9, 358/3.01, 3.21, 1.2, 504, 518, 521
See application file for complete search history.

(56) References Cited

U.S. PATENT DOCUMENTS

| 5,303,334 A | * | 4/1994 | Snyder et al. | ............... 358/1.9 |
| 5,933,676 A | * | 8/1999 | Ohno | ......................... 358/504 |
| 6,111,657 A | * | 8/2000 | Muto et al. | .................. 358/1.2 |

* cited by examiner

*Primary Examiner*—Scott A. Rogers
(74) *Attorney, Agent, or Firm*—Fitzpatrick, Cella, Harper & Scinto

(57) ABSTRACT

In order to carry out gradation drawing processing without causing deterioration of printing processing throughput, i.e., deterioration of printer engine performance, in the event that a received drawing command is a gradation drawing command, the degree of change of color within the gradation drawing area is obtained, and a thinning-out level within the gradation drawing area is determined, based on the obtained degree of change of color. An enlargement value is determined based on the thinning-out level decided upon, and instructions are given to an image processing unit to draw the gradation drawing area in a manner enlarged with the enlarging value decided upon. Next, the color values of the pixel values within the gradation drawing area are calculated at pixel intervals determined by the thinning-out level, and this is used as gradation data.

20 Claims, 16 Drawing Sheets

TRIANGULAR GRADATION DRAWING

IMAGE PROCESSING DEVICE AND METHOD, IMAGE FORMING DEVICE AND METHOD, AND INFORMATION PROCESSING DEVICE AND METHOD

BACKGROUND OF THE INVENTION

1. Field of the Invention

The present invention relates to an image processing device, image forming device, information processing device, and methods thereof. More specifically, present invention relates to an image processing device, image forming device, information processing device, and methods thereof, capable of performing gradation drawing processing without deterioration in printing processing throughput.

2. Description of the Related Art

In recent years, DTP (Desk Top Publishing) and presentation software run on host computers has increased in functions, so complicated drawing can be easily expressed. In the event of printing with such application software, the complicated drawing data is converted into optimal PDL (Page Description Language) data by a printer driver, and then transmitted to a printer. The PDL data received by the printer is subjected to analyzing processing by the printer controller, rendered at high speed according to commands, and output at high speed with high quality, without causing deterioration in the performance of the printer engine.

However, in the event of performing gradation drawing wherein the color is changed slightly from one pixel to another, transmitting gradation drawing command PDL data to the printer with a printer driver and rendering this with a printer controller causes the following problems.

First, there is a problem in that calculating all colors in the gradation drawing area takes an extremely long time. Also, there is a problem in that great gradation drawing areas require a massive amount of memory.

Also, performing rendering processing for gradation drawing commands with the printer driver of the host computer causes the following problem.

That is, the increased amount of data requires much time for data transfer.

Either way, whether performing rendering processing at the printer controller side or the host computer side, gradation drawing is a factor causing deterioration of printing processing throughput, i.e., printer engine performance.

SUMMARY OF THE INVENTION

Accordingly, it is an object of the present invention to provide an image processing device, image forming device, information processing device, and methods thereof, capable of solving the above problems.

Also, it is an object of the present invention to provide an image processing device and method capable of performing gradation drawing processing without deterioration in printing processing throughput, i.e., without deterioration in printer engine performance.

To this end, according to a first aspect of the present invention, an image processing device comprises: obtaining means for obtaining the degree of change of color within a gradation drawing area; determining means for determining a thinning-out level within the gradation drawing area, based on the degree of change of color obtained by the obtaining means; and calculating means for calculating the color value of pixels within the gradation drawing area at pixel intervals determined by the thinning-out level.

Also, to this end, according to another aspect of the present invention, an image processing method comprises: an obtaining step for obtaining the degree of change of color within a gradation drawing area; a determining step for determining a thinning-out level within the gradation drawing area, based on the degree of change of color obtained in the obtaining step; and a calculating step for calculating the color value of pixels within the gradation drawing area at pixel intervals determined by the thinning-out level.

Also, to this end, according to other aspects of the present invention, an image forming device and method, and information processing device and method, using the above image processing method, are provided.

The present invention relates to an image processing device, image forming device, information processing device, and methods thereof, having new functions.

Further objects, features and advantages of the present invention will become apparent from the following description of the preferred embodiments with reference to the attached drawings.

DESCRIPTION OF THE PREFERRED EMBODIMENTS

First Embodiment

Figure 1:
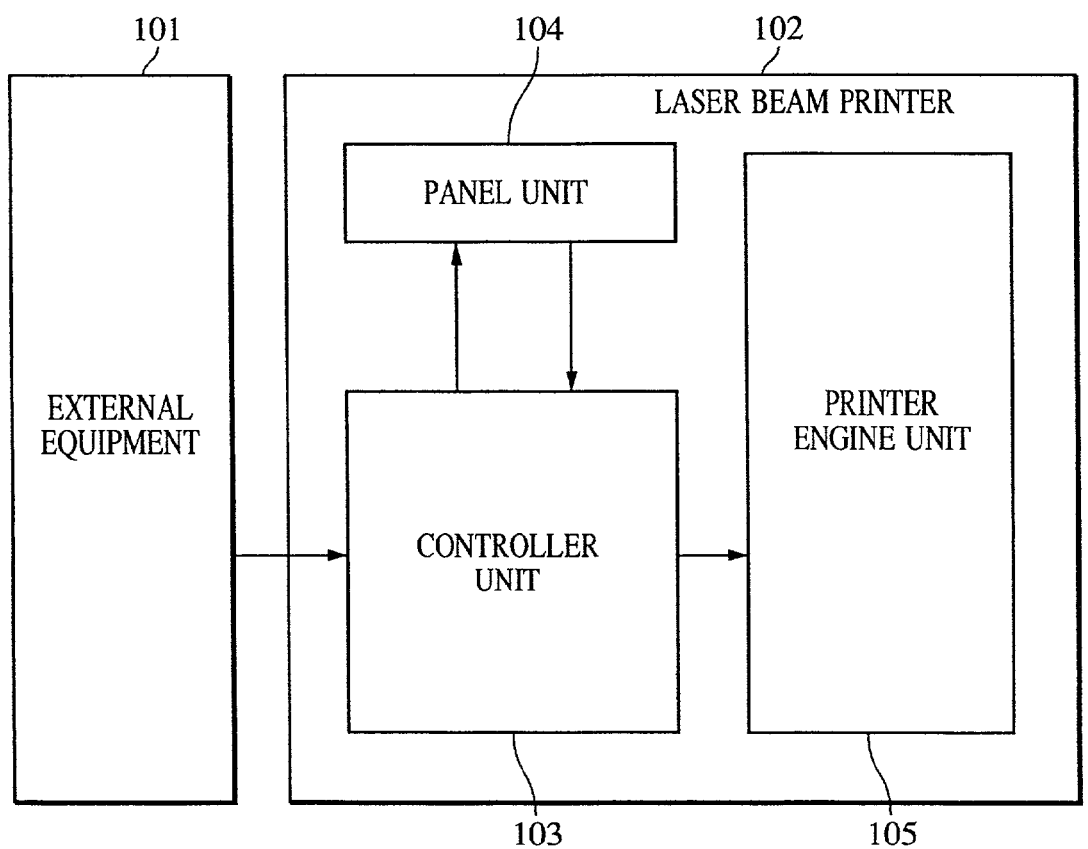
FIG. 1 is a block diagram illustrating a schematic configuration of an image forming system according to a first embodiment.

FIG. 1 is a block diagram illustrating a schematic configuration of an image forming system according to the first embodiment.

In FIG. 1, reference numeral 101 denotes external equipment such as a host computer or the like. Reference numeral 102 denotes a laser beam printer for performing gradation drawing processing according to the present embodiment. In this laser beam printer 102, 105 denotes a printer engine unit 105. The printer engine unit 105 forms a latent image on a photosensitive drum by a known electro-photography process based on image data, develops the latent image, and transfers and fixes this in a sheet, thereby performing image recording. Reference numeral 103 denotes a controller unit. The controller unit 103 is connected to the printer engine unit 105 and receives code data (ESL code, various types of PDL, etc.) sent from the external equipment 101 such as a host computer or the like, generates page information formed of dot data based on the code data, and transmits image data to the printer engine unit 105 by predetermined interface means. Reference numeral 104 denotes a panel unit for interfacing with a user (operator). The user can instruct the printer 102 to perform certain actions by operating the panel unit 104.

Figure 2:
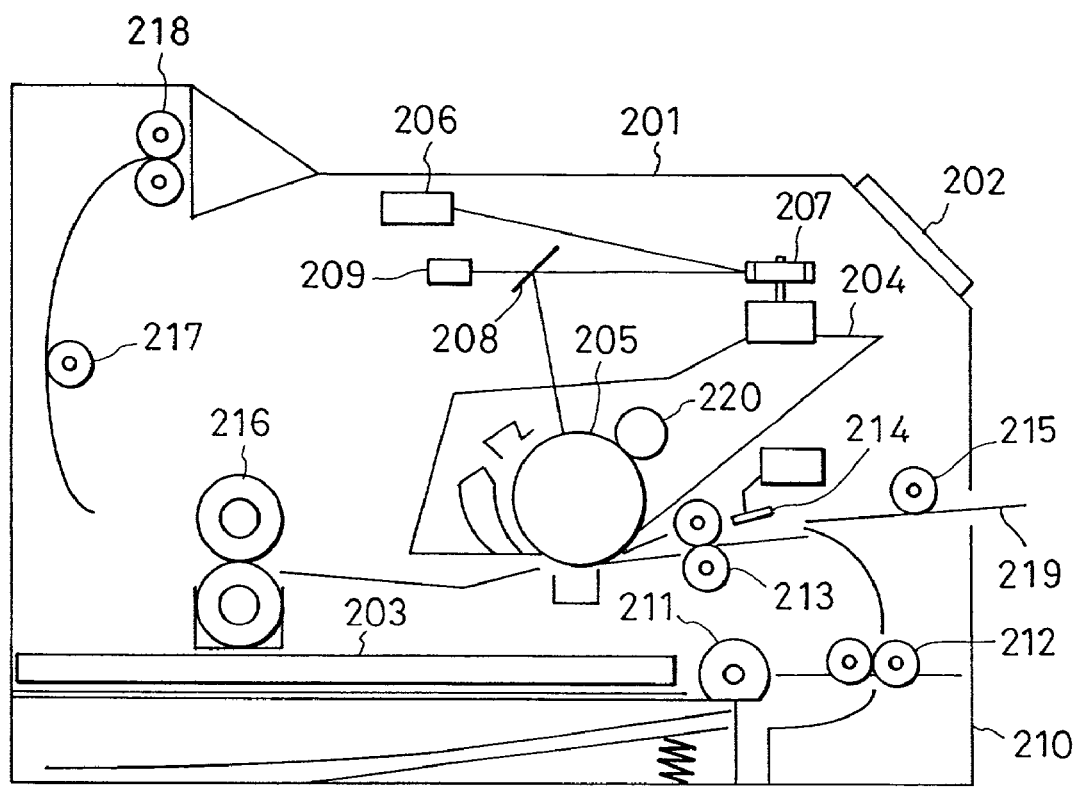
FIG. 2 is a schematic mechanism drawing of a laser beam printer 102 according to the first embodiment.

FIG. 2 is a schematic mechanism drawing of a laser beam printer 102 according to the first embodiment.

In FIG. 2, reference numeral 201 denotes a printer casing. Reference numeral 202 denotes an operating panel. Arrayed on the operating panel 202 are switches, LED displays, and LCD displays, for operating. These are the physical side of the panel unit 104 shown in FIG. 1. Reference numeral 203 denotes a control board storing unit. The control board storing unit 203 stores the printer engine unit 105 which performs printing process control for the printer, and the printer controller unit 103 which controls the overall printer and analyzes data from the host computer, and converts the data into image data.

Reference numeral 210 denotes a sheet cassette for holding sheets such as paper or the like. The sheet cassette 210 has a mechanism for electrically detecting the sheet size with an unshown partition. Reference numeral 211 denotes a cassette sheet feeding clutch. The cassette sheet feeding clutch 211 is a cam which separates only the topmost sheet of the sheets loaded in the sheet cassette 210, and transports the separated sheet to a sheet feeding roller 212 by unshown driving means. The cassette sheet feeding clutch 211 is driven intermittently each time sheet feeding is performed, and feeds one sheet per rotation. Reference numeral 214 denotes a resist shutter. The resist shutter 214 presses the sheet and stops the sheet feeding. The sheet feeding roller 212 transports the tip of the sheet to the resist shutter 214. Reference numeral 219 denotes a manual feeding tray. Also, reference numeral 215 denotes a manual feeding clutch. The manual feeding clutch 215 transports the tip of the sheet to the resist shutter 214. The above-described configuration allows sheets to be selectively fed from the sheet cassette 210 and the manual feeding tray 219.

The printer engine unit 105 performs communication with the printer controller unit 103 by a predetermined communication protocol, and decides on the sheet feeding means to use, whether the cassette 210 or the manual feeding tray 219, based on instructions from the printer controller unit 103.

Then, sheet feeding as described above is initiated by a printing start instruction, thereby transporting a sheet to the resist shutter 214.

Reference numeral 204 denotes a cartridge. The cartridge 204 has a photosensitive drum 205 and an unshown toner holding unit. Reference numeral 206 denotes a laser driver, 207 denotes a rotating polygonal mirror, 208 denotes a reflecting mirror, and 209 denotes a beam detector. Upon the sheet being transported to the resist shutter 214, a laser beam emitted from an unshown semiconductor laser driven on and off by the laser driver according to image data sent from the printer controller uni 103 is scanned in the main scanning direction by the rotating polygonal mirror 207 and introduced by the reflecting mirror to the photosensitive drum 205 where an image is formed, thus scanning the photosensitive drum 205 in the main scanning direction and forming a latent image. The resist shutter 214 is driven upwards in a manner synchronous with the emitting of the laser beam, and the transporting of the sheet is synchronized with the scanning of the laser beam. The beam detector 209 disposed at the scanning start position of the laser beam forms synchronizing signals for determining the timing main scan image writing by detecting the laser beam, and sends the signals to the printer control unit 103.

Subsequently, the sheet is transported by a transporting roller 213, the photosensitive drum is rotationally driven by an unshown motor, the latent image is manifested as a toner image by a developer 220, and the transferred into the sheet. Following the transfer of the toner image, the sheet is subjected to thermal fixing of the toner image by a fixing roller 216, and the sheet passes over a transporting roller 217 and is discharged onto a discharge tray of the printer casing by a discharging roller 218.

Figure 3:
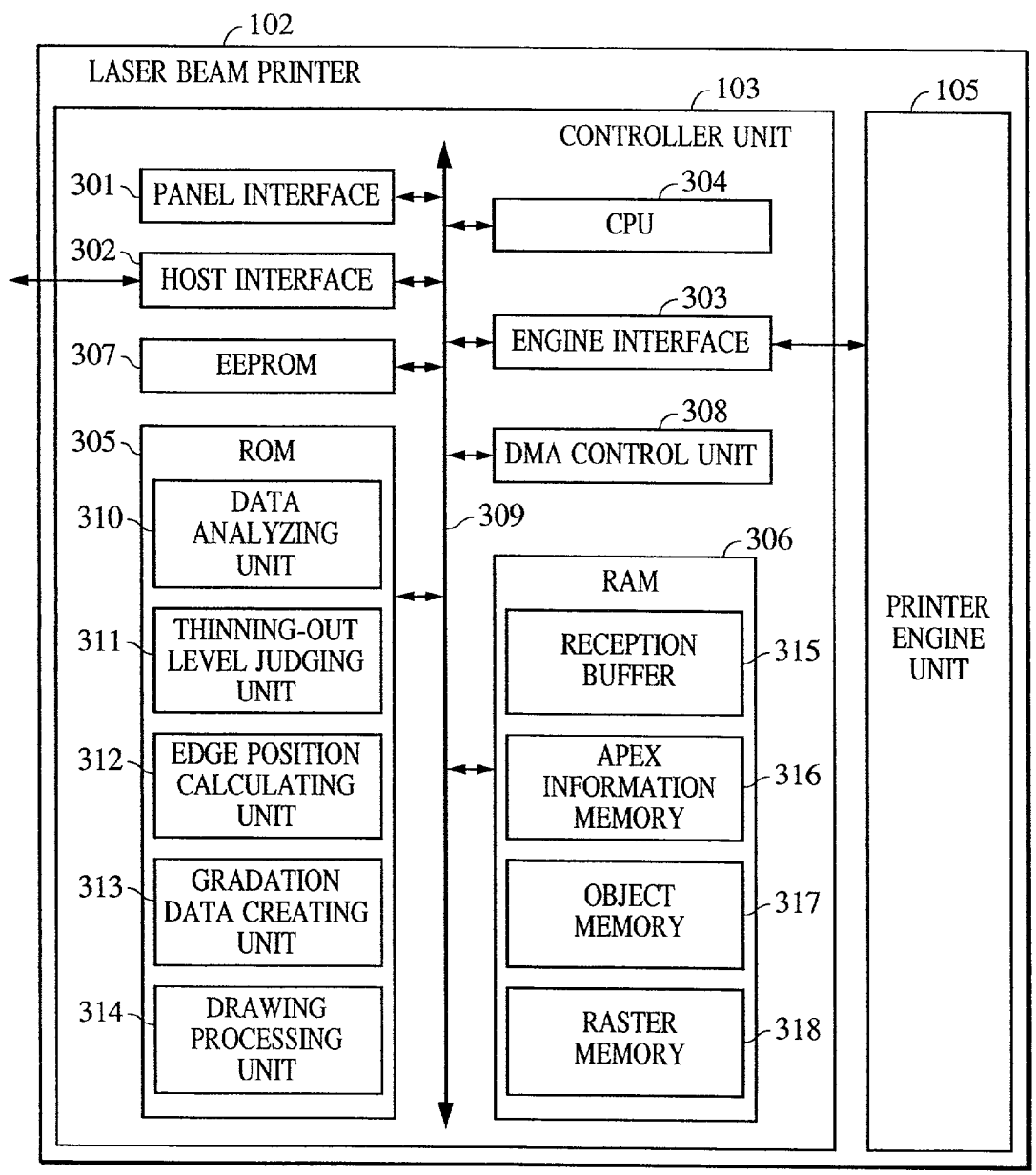
FIG. 3 is a block diagram illustrating the configuration of a printer controller unit 103 according to the first embodiment.

FIG. 3 is a block diagram illustrating the configuration of the printer controller unit 103 according to the first embodiment.

In FIG. 3, reference numeral 301 denotes a panel interface. The panel interface 301 receives various settings and instructions made by the operator at the panel unit 104, by data communication with the panel unit 104. Reference numeral 302 denotes a host interface. The host interface 302 is an input/output unit for signals exchanged with the external equipment 101 such as a host computer or the like. Reference numeral 303 denotes an engine interface. The engine interface 303 functions as an input/output unit for signals exchanged with the engine unit 105, performing data signal sending from an unshown output buffer register and also controlling communications with the printer engine unit 105.

Reference numeral 304 denotes a CPU. The CPU 304 governs controlling of the entire printer controller unit 103. Reference numeral 305 denotes Read-Only Memory (ROM). The Read-Only Memory 305 stores control code for realizing the processing functions realized by the components 310 through 314 described below, executed by the CPU 304.

Reference numeral 310 denotes a data analyzing unit. The data analyzing unit 310 analyzes the data received by the host interface 302, and appropriates the data to predetermined processing. Reference numeral 311 denotes a thinning-out level deciding unit. The thinning-out level deciding unit decides on the thinning-out level for the gradation drawing in the event that the data analyzing unit 310 judges that the data mandates gradation drawing. Reference numeral 312 denotes an edge position calculating unit. The edge position calculating unit 312 calculates the coordinates of edges for each scan line in the gradation drawing.

Reference numeral 313 denotes a gradation data creating unit, for creating data corresponding to each of the pixels between the edges calculated by the edge position calculating unit. Reference numeral 314 denotes a drawing processing unit. The drawing processing unit 314 performs raster data rendering of the created data. The data analyzing unit 310, the thinning-out determining unit 311, the edge position calculating unit 312, the gradation creating unit 313, and the drawing processing unit 314, are each control programs stored in the ROM 305, and are functions realized by the CPu 304 executing these control programs.

Reference numeral 306 denotes RAM. The RAM 306 is temporary storage memory which the CPU 304 uses, and contains the following memory areas. Reference numeral 315 denotes a reception buffer. The reception buffer 315 temporarily stores data received at a host interface 302. Reference numeral 316 denotes apex information memory. The apex information memory 316 stores coordinates and color information specified in the gradation drawing. Reference numeral 317 denotes object memory. The object memory 317 stores various types of object images, including gradation images created by the gradation creating unit 313. Reference numeral 318 denotes raster memory. The raster memory 318 stores data wherein the objects stored in the object memory 317 have been rendered to predetermined resolution and gradients by the drawing processing unit 314.

Reference numeral 307 denotes an engine interface. The engine interface 307 is made up or EEPROM serving as non-volatile memory means. Reference numeral 308 denotes a DMA control unit. The DAM control unit 308 transfers bit-map data within the raster memory to the engine interface 303, under instruction from the CPU 304.

Reference numeral 309 denotes a system bus having an address bus and data bus. The above-described panel interface 301, host interface 302, engine interface 303, CPU 309, ROM 305, RAM 306, EEPROM 307, and DAM control unit 308, are each connected to the system bus 309, so as to be capable of accessing all functions on the system bus 309.

Note that the control code for controlling the CPU 304 is configured of an operating system for performing time-division control in increments of load modules called tasks with an unshown system clock, and multiple load modules (tasks) operating in increments of functions.

Figure 4:
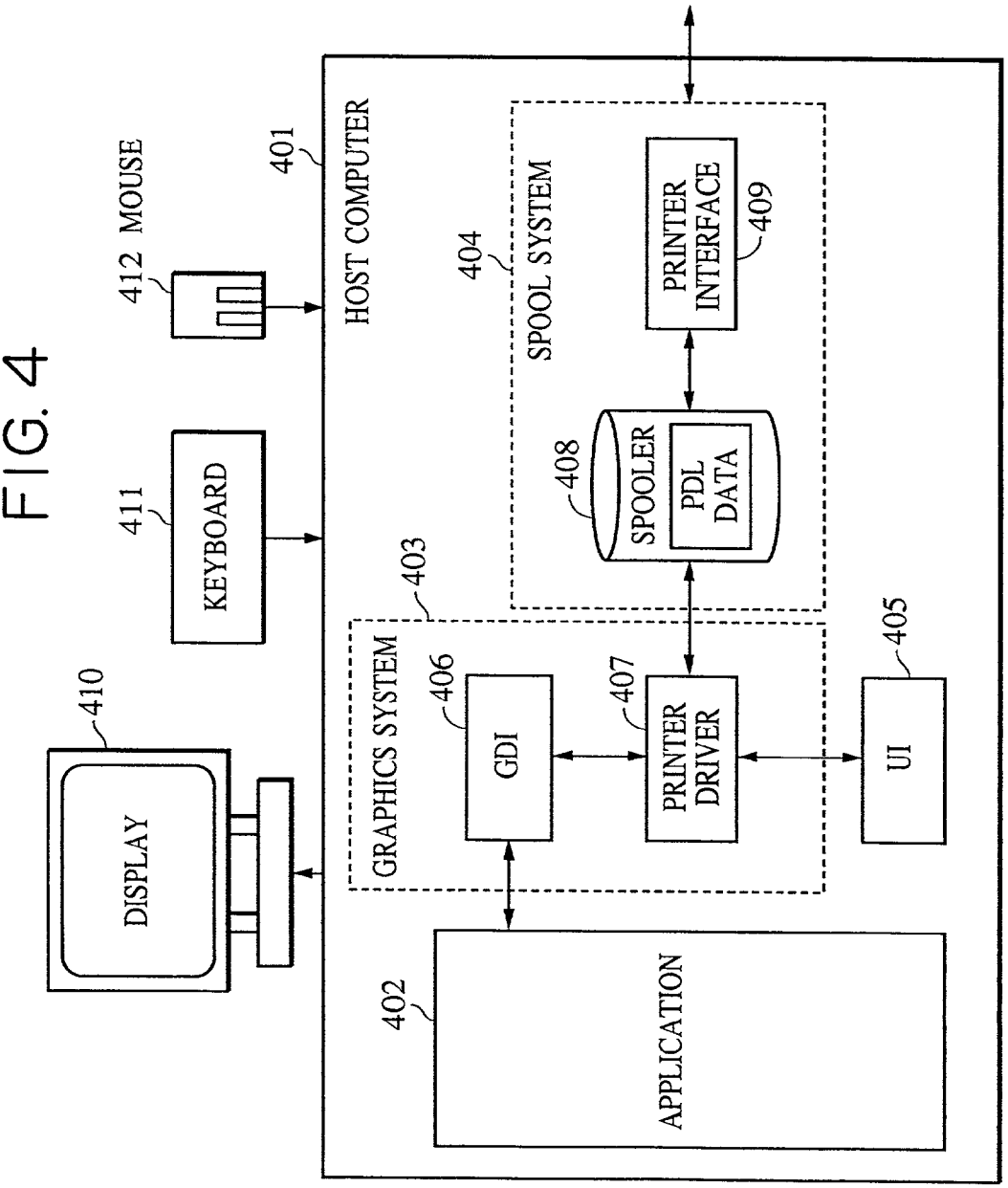
FIG. 4 is a block diagram describing the schematic configuration of external equipment 101 such as a host computer or the like in the first embodiment.

Next, description will be made regarding the host side system. FIG. 4 is a block diagram describing the schematic configuration of the external equipment 101 such as a host computer or the like according to the first embodiment. In FIG. 4, reference numeral 401 denotes a host computer. The host computer 401 outputs printing information containing print data and control code to a printing device 300. The host computer 401 is configured as a single computer system having a combination of a keyboard 411 which is an input device, a mouse 412 which is a pointing device, and a display 410 which is a display device. With the present embodiment, the host computer 401 operates under basic operating systems such as MS-DOS (a registered trademark) or Windows (a registered trademark).

Taking note of the functional parts of the host computer 401 relating to the present embodiment allows the functions operating on the basic operating system to be generally classified into applications 402, a graphic system 403 serving as image information processing means, a data storing unit, a spool system 404 including a printing data storage control unit and a communication unit for communication with a printing device, and a UI processing unit 405 for realizing a user interface.

The applications 402 mean application software such as word processor or spreadsheet programs which run on the basic software. The graphic system 403 is configured of a Graphic Device Interface (hereafter referred to simply as "GDI") 406 which is a part of the basic operating system functions, and a printer driver 407 which is a device driver dynamically linked to from the GDI. The primary role of the printer driver 407 here is to convert drawing commands called as GDI into PDL format. Gradation drawing commands relating to the present embodiment are received and subjected to appropriate processing, by GDI drawing commands and driver settings.

The spool system 404 is a printer-specific system situated after the graphics system 403, and is configured of a spooler 408 for temporarily storing PDL data created at the graphic system 403 and a printer interface 409 for reading out the PDL data stored in the spooler 408 and transmitting this to the laser beam printer 102 which is the printing device.

Though there are some differences regarding the names and functional framework of the above-described components depending on the basic operating system, the present embodiment is not essentially dependent on the names or framework of such; rather, any modules capable of realizing the technical means described here with the present embodiment will suffice. For example, the component referred to as a "spooler" may as well be realized by processing performed by a module called a "print queue" under another operating system.

Now, generally, the host computer 401 containing these function modules is arranged such that software called basic software governs control thereof with hardware such as an unshown Central Processing Unit (CPU), Read-Only Memory (ROM), Random Access Memory (RAM), Hard Disk Drives (HDD), various input/output control units (I/O), and so forth, and each of the application software and system processes operated as function modules under the basic software.

Next, the processing for the gradation drawing according to the present embodiment will be described.

In the event that a user uses an application or the like to create presentation data or DTP data, and print the data, the printer driver converts drawing commands called as GDI into PDL data. At this time, in the event that a shape specified with gradation is included, a gradation drawing command is issued for the shape specified with gradation.

Figure 5:
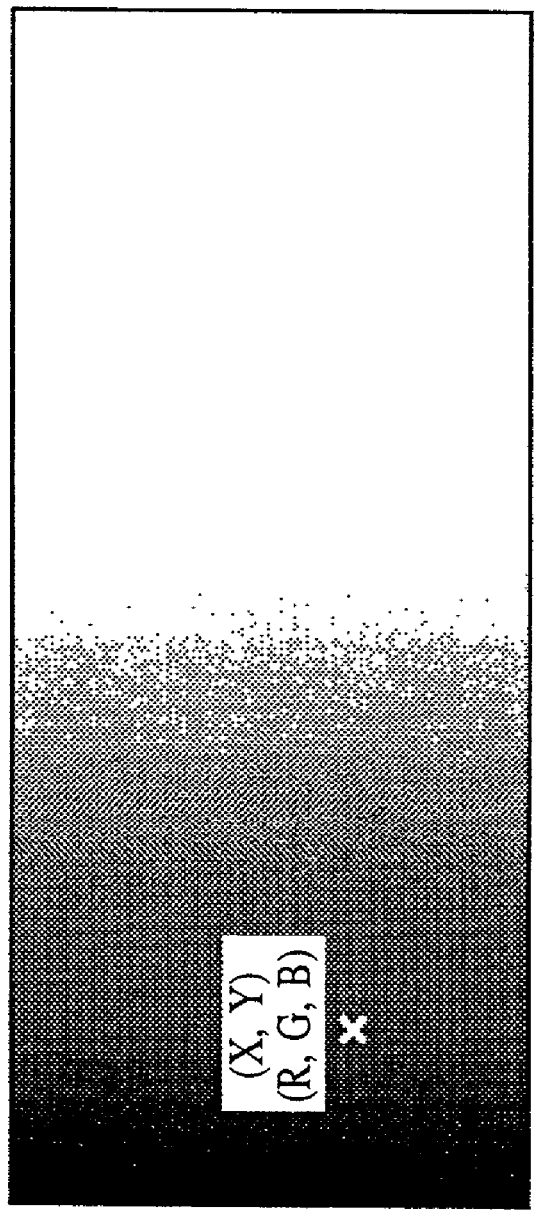
FIG. 5 is a diagram describing horizontal gradation drawing.

There are three types of gradation drawing commands issued. That is, (1) horizontal gradation specification (see FIG. 5) wherein the coordinates of two diagonal apexes of a rectangle, and the color of each of the apexes are specified, and color is changed in the horizontal direction from the color of one apex to the color of the other apex, (2) vertical gradation specification (see FIG. 6) wherein color is changed in the vertical direction from the color of one apex to the color of the other apex, and (3) triangular gradation specification (see FIG. 7) wherein the coordinates of the three apexes of a triangle, and the color of each of the apexes, are specified, and color is changed within the three apexes.

The gradation drawing commands are converted into PDL data as with the other drawing commands, and transmitted to the printing device (the laser beam printer 102 in the present embodiment). The, upon the printer controller receiving this gradation drawing command, gradation drawing is performed following the equations listed below.

(1) Calculating Color Within a Rectangular Area in Horizontal Gradation Specification Color within a rectangular area is calculated with the following equations with horizontal gradation specification. With the coordinates of Apex 1 of the rectangle as (X1, Y1), the color thereof as (R1, G1, B1), the coordinates of Apex 2 of the rectangle as (X2, Y2), and the color thereof as (R2, G2, B2), the color (R, G, B) of a certain point at the coordinates (X, Y) within the rectangle area is obtained as follows.

$$R=(R2\times(X-X1)+R1\times(X2-X))/(X2-X1)$$

$$G=(G2\times(X-X1)+G1\times(X2-X))/(X2-X1)$$

$$B=(B2\times(X-X1)+B1\times(X2-X))/(X2-X1)$$

Horizontal gradation is not dependent on the Y coordinate, and all areas having the same X coordinate are drawn with the same color.

(2) Calculating Color Within a Rectangular Area in Vertical Gradation Specification Color within a rectangular area is calculated with the following equations with vertical gradation specification. With the coordinates of Apex 1 of the rectangle as (X1, Y1), the color thereof as (R1, G1, B1), the coordinates of Apex 2 of the rectangle as (X2, Y2), and the color thereof as (R2, G2, B2), the color (R, G, B) of a certain point at the coordinates (X, Y) within the rectangle area is obtained as follows.

$$R=(R2\times(Y-Y1)+R1\times(Y2-Y))/(Y2-Y1)$$

$$G=(G2\times(Y-Y1)+G1\times(Y2-Y))/(Y2-Y1)$$

$$B=(B2\times(Y-Y1)+B1\times(Y2-Y))/(Y2-Y1)$$

Vertical gradation is not dependent on the X coordinate, and all areas having the same Y coordinate are drawn with the same color.

(3) Calculating Color Within a Triangular Area in Triangular Gradation Specification Color within a triangular area is calculated with the following equations with triangular gradation specification. With the coordinates of Apex 1 of the triangle as (X1, Y1), the color thereof as (R1, G1, B1), the coordinates of Apex 2 of the triangle as (X2, Y2), the color thereof as (R2, G2, B2), the coordinates of Apex 3 of the triangle as (X3, Y3), and the color thereof as (R3, G3, B3), the color (R, G, B) of a certain point at the coordinates (X, Y) within the triangle area is obtained as follows, $$R=(R1\times S1+R2\times S2+R3\times S3)/(S1+S2+S3)$$

$$G=(G1\times S1+G2\times S2+G3\times S3)/(S1+S2+S3)$$

$$B=(B1\times S1+B2\times S2+B3\times S3)/(S1+S2+S3)$$

wherein S1 represents the area of a triangle having the three apexes of Apex 2, Apex 3, and a point having coordinates (X, Y) within the area, S2 represents the area of a triangle having the three apexes of Apex 1, Apex 3, and a point having coordinates (X, Y) within the area, and S3 represents the area of a triangle having the three apexes of Apex 1, Apex 2, and a point having coordinates (X, Y) within the area.

Figure 9:
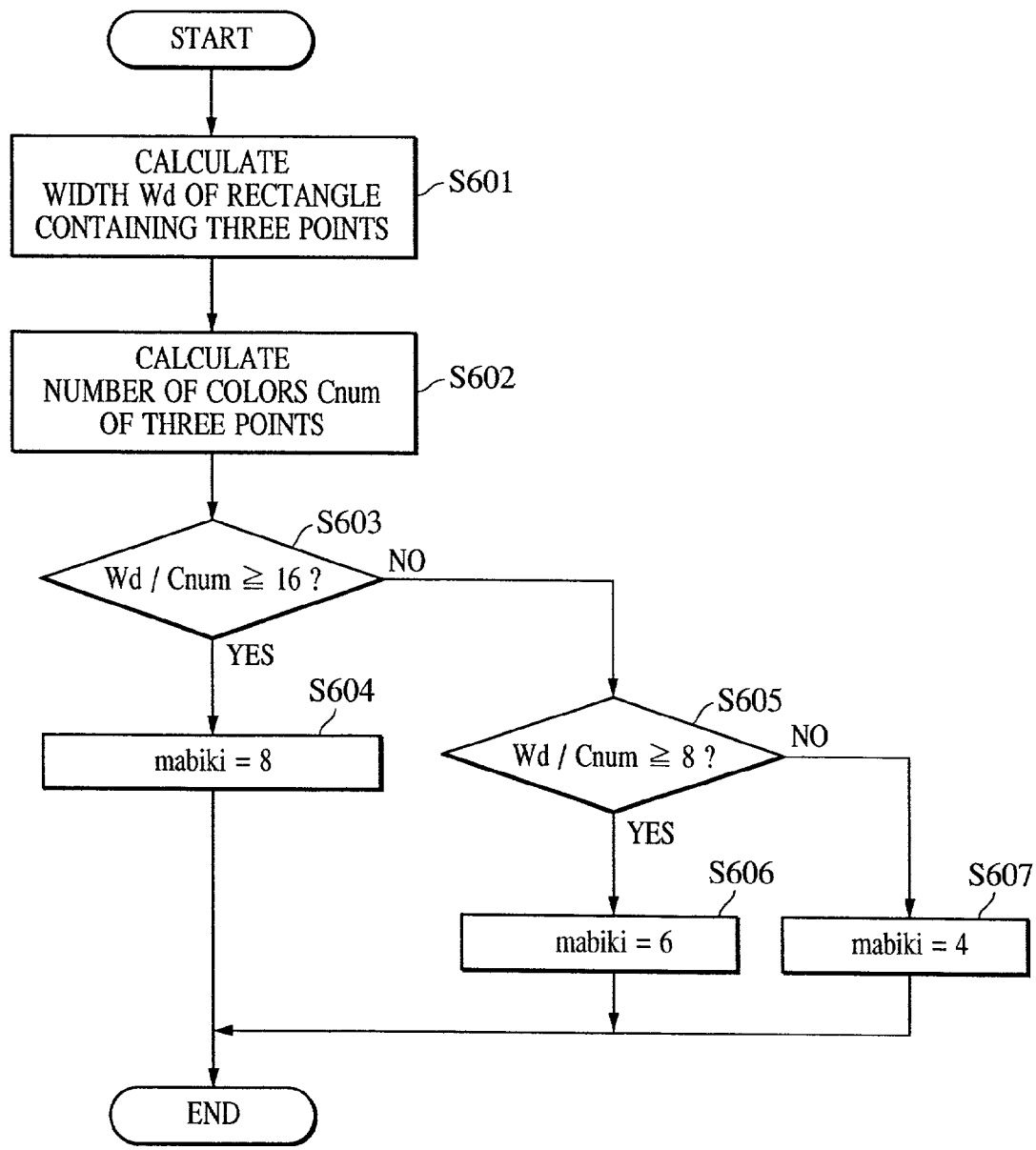
FIG. 9 is a flowchart illustrating the detailed processing for thinning-out level calculation according to the first embodiment.
Figure 10:
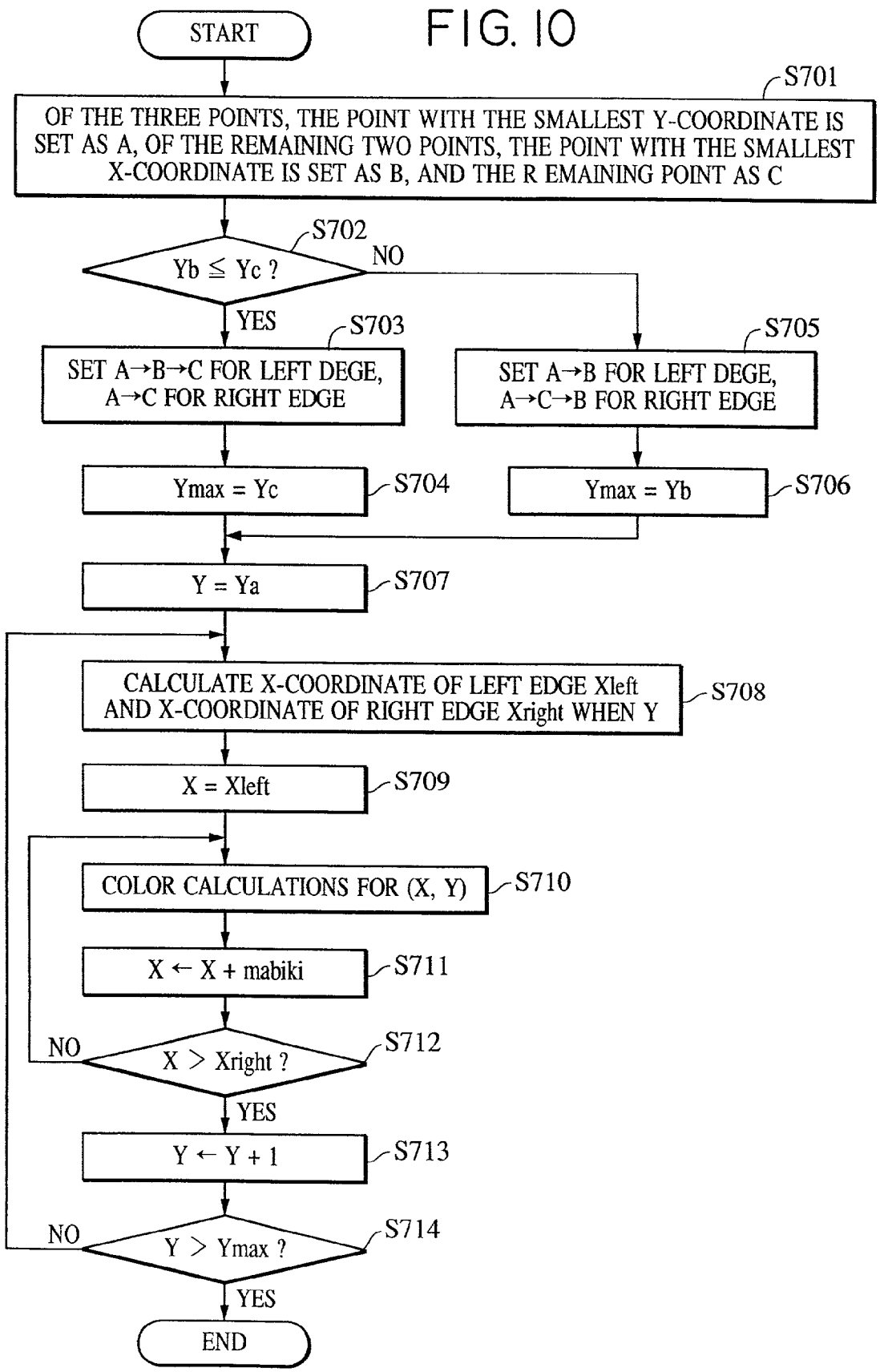
FIG. 10 is a flowchart illustrating the detailed processing of creating gradation image data (step S506) in FIG. 8.

Next, flowcharts for gradation drawing with the printing device according to the present embodiment will be described with reference to FIGS. 8 through 10.

Figure 8:
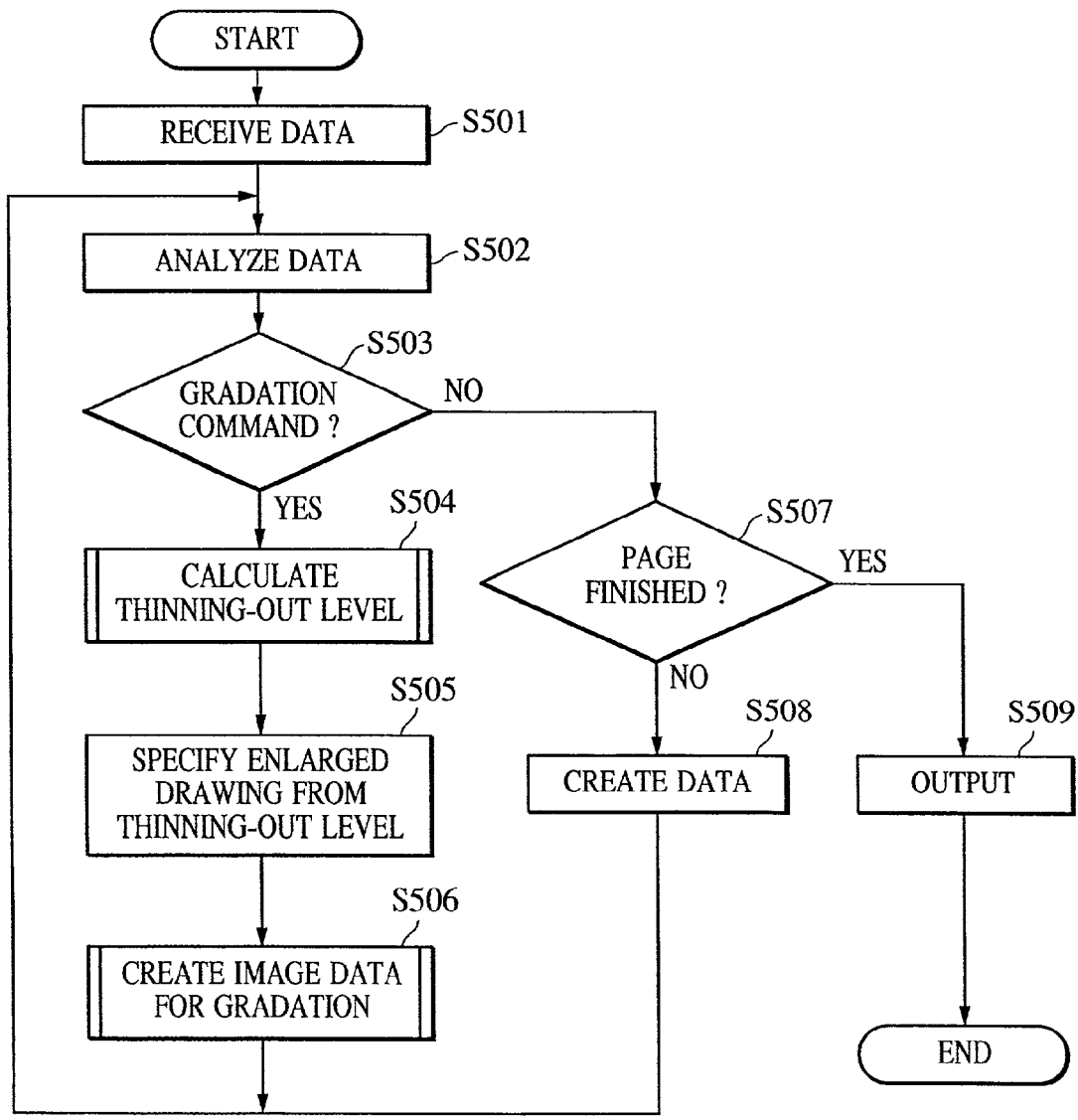
FIG. 8 is a flowchart illustrating the processing from data reception to output at a printing device.

FIG. 8 is a flowchart illustrating the processing from data reception to output at the printing device.

Once PDL data is received from the printer interface 409 of the host computer 401, the printing device 102 receives PDL data through the host interface 302 (step S501). The received PDL data is constantly stored in the reception buffer 315. The data analyzing unit 310 of the printing device 102 reads out the data stored in the reception buffer 315, and performs command analysis (Step S502). Various types of processing are executed according to the results of analysis of the commands.

Judgment is made regarding whether or not the command is for gradation drawing, based on the results of the command analysis (step S503). In the event that the command is for gradation drawing, thinning-out level calculations for gradation drawing are performed at the thinning-out level deciding unit 311 (step S504). An enlargement value is determined based on the calculated thinning-out level, and specification is made to the drawing processing unit 314 to draw the gradation image data of the gradation drawing area created at the later step S506 at that enlargement value (step S505). Further, gradation image data is created following the thinning-out level, and stored in the object memory 317 (step S506). Once creating of the gradation image data is completed, data analysis is performed again on the remaining PDL.

Figure 12:
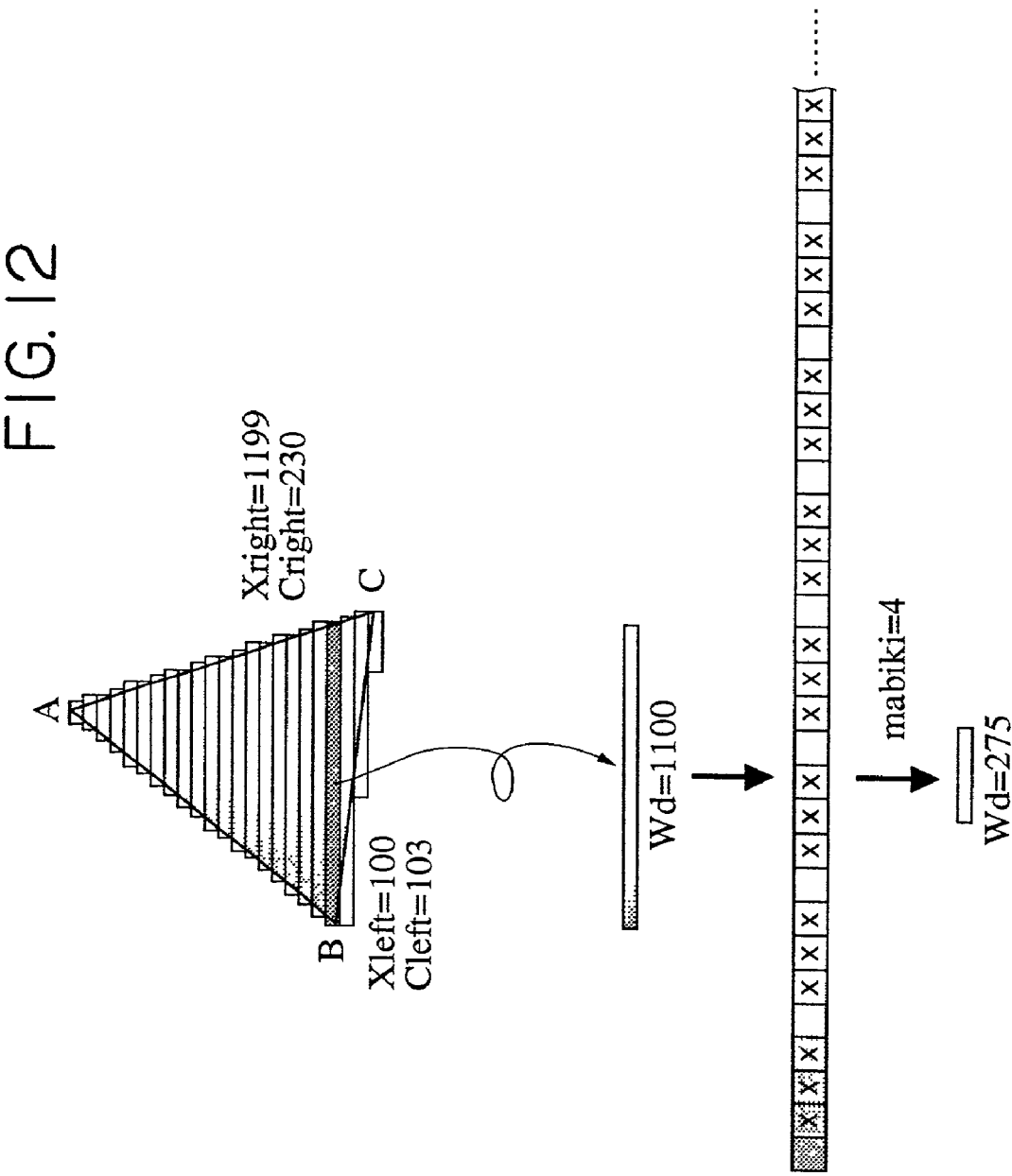
FIG. 12 is a diagram illustrating an example of creating scan line data at thinning-out level 4 according to the gradation image creating flowchart.

With the present embodiment, the number of pixels thinned is a number one smaller than the thinning-out level, and color values are calculated for gradation drawing as described above regarding the remaining pixels. For example, FIG. 12 shows a triangular gradation drawing area having three apexes A, B, and C. Details are shown regarding one scanning line (1,100 pixels) within the drawing area. In the event that the thinning-out level is set to 4 as shown in FIG. 12 (mabiki=4), 4−1=3 means that 3 pixels are thinned in step S506, and the gradation drawing color values for every four pixels (skipping three pixels at a time) are calculated. That is to say, in FIG. 12, the pixels marked with an "X" do not have the color values thereof calculated for gradation drawing. Consequently, the gradation drawing is reduced to ¼, so in step S505 the thinning-out level 4 is set as the enlarging value, thereby multiplying the gradation image by four times at the time of rendering drawing to the raster memory.

Calculating of the thinning-out level in step S504 and creating of the gradation image data in step S506 will be described later with reference to the flowchart shown in FIGS. 9 and 10.

On the other hand, in the event that the command analysis judges that the drawing command is other than gradation drawing, drawing data corresponding to the command is created and stored in the object memory 317 (steps S503, S507, and S508). In the event that drawing relating to the drawing command has been completed, data analysis is performed again on the remaining PDL.

Further, in the event that the commands as judged to the a page end command in the data analysis, the drawing data stored in the object memory 317 is subjected to rendering processing by the drawing processing unit 314 to the raster memory 318 at predetermined resolution and gradients, and output (steps S503, S507, and S509).

Next, description will be made regarding the thinning-out level calculation processing in step S504. FIG. 9 is a flowchart illustrating the detailed processing of the thinning-out level calculations according to the first embodiment.

First, the width Wd of a rectangular area specified by two points by the gradation drawing command or a rectangular area containing a triangular area specified by three points, is calculated (S601). Though in the following, description is made of the gradation drawing area as being a rectangular area or triangular area, but the description of the present embodiment should make it clearly understood to any skilled in the art that the same technique can be applied to other polygonal areas.

Next, the number of colors Cnum corresponding to the overall amount of change of color in the gradation drawing area is calculated (step S602).

The equations for calculating the width Wd and the number of colors Cnum are as given below. That is, in the event that the gradation drawing area is a rectangular area specified by two points, with the coordinates of Apex 1 of the rectangle as (X1, Y1), the color thereof as (R1, G1, B1), the coordinates of Apex 2 as (X2, Y2), and the color thereof as (R2, G2, B2), the width Wd is $$Wd = abs(X2-X1)+1,$$

and the number of colors Cnum is $$R = abs(R2-R1)+1,$$

$$G = abs(G2-G1)+1,$$

$$B = abs(B2-B1)+1,$$

$$Cnum = max(R, G, B)$$

wherein abs represents an absolute value.

Also, in the event that the gradation drawing area is a triangular area specified by three points, with the coordinates of Apex 1 of the rectangle as (X1, Y1), the color thereof as (R1, G1, B1), the coordinates of Apex 2 of the rectangle as (X2, Y2), the color thereof as (R2, G2, B2), the coordinates of Apex 3 of the rectangle as (X3, Y3), and the color thereof as (R3, G3, B3), the width Wd is $$Wd = max(X1, X2, X3) - min(X1, X2, X3) + 1$$

and the number of colors Cnum is $$R = max(R1, R2, R3) - min(R1, R2, R3) + 1$$

$$G = max(G1, G2, G3) - min(G1, G2, G3) + 1$$

$$B = max(B1, B2, B3) - min(B1, B2, B3) + 1$$

$$Cnum = max(R, G, B).$$

In any case, with three present embodiment, the width of the smallest rectangle encompassing the gradation drawing area is Wd, and the greatest value of the difference between the greatest value and smallest value of brightness of each of the color components in the gradation area is taken as the number of colors. In the event that this is grayscale (monotone), the difference between the greatest value and smallest value of the grayscale value (brightness value) is taken as the number of colors and represented by "Cmax−Cmin".

Next, the width Wd thus obtained is divided by the number of colors Cnum, thereby obtaining the number of pixels per color change in the gradation drawing area, and the thinning-out level is determined according to the obtained number of pixels. This corresponds to the number of pixels in the gradation drawing area where the same color is maintained, so the greater the number of pixels is, the smaller the degree of color change in the gradation drawing is, and accordingly the thinning-out level can be increased.

With the present embodiment, in the event that Wd/Cnum of the Wd and Cnum obtained by the equations is 16 or greater (step S603), the thinning-out level mabiki is set at 8 (step S604), in the event that Wd/Cnum is 8 or greater but less than 16 (step S605), the thinning-out level mabiki is set at 6 (step S606), and in the event that Wd/Cnum is less than 8, the thinning-out level mabiki is set at 4 (step S607).

Though Wd/Cnum is used in the present embodiment, an arrangement may be made wherein Cnum/Wd is obtained, thereby obtaining the degree of color change in the gradation drawing area, from which the thinning-out level is decided (i.e., in the event that color change is great, the thinning-out level is reduced to match the color change). It is clear that the technical implications are the same regardless whether Wd/Cnum is used or Cnum/Wd is used.

Figure 11:
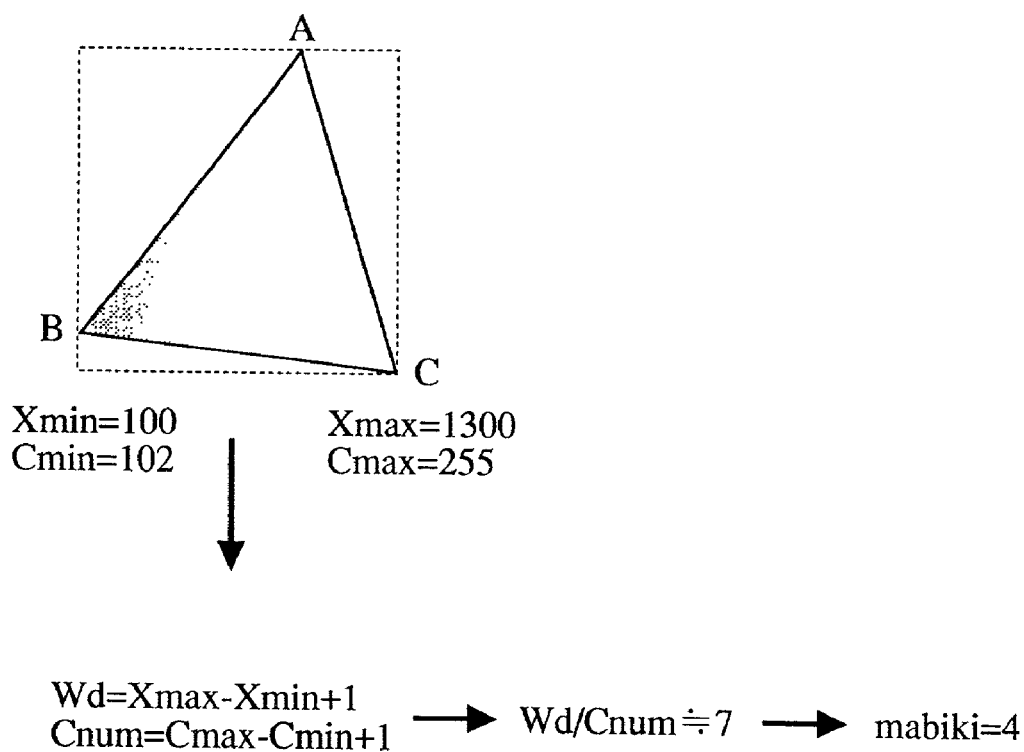
FIG. 11 is a diagram illustrating an example of a calculation of thinning-out level according to the thinning-out level calculating flowchart.

FIG. 11 is a diagram illustrating an example of calculating the thinning-out level following the thinning-out level calculating flowchart. A smallest rectangular area enveloping a triangle A, B, C which is the gradation drawing area is indicated by dotted lines, and Wd is the width of this rectangular area (Xmax−Xmin=1,200). In the event that the shape is monotone, the number of colors is obtained as Cnum=Cmax−Cmin=255−102=153. Accordingly, the value of wd/Cnum is approximately 7, so the thinning-out level (mabiki) is 4.

The creating of gradation image data in step S506 is performed according to the thinning-out level calculated according to the above-described method. FIG. 10 is a flowchart illustrating the detailed processing of the creating of gradation image data (step S506) in FIG. 8.

First, in steps S701 through S706, the sides making up the polygon specified as a gradation drawing area are divided into a side defining the left edge and a side defining the right edge at the time of raster sequence drawing, and also, the range of Y coordinates (Ymin, Ymax) for raster scanning is determined. In steps S701 through S706, a case of a triangle is given as an example of the gradation drawing area. Of course, similar processing can be applied for other polygons as well.

First, the apex at the smallest Y coordinate of the three points for triangular gradation specification is set as A, the apex at the smallest X coordinate of the remaining two points is set as B, and the remaining apex is set as C (step S701). In the event that the Y coordinate of the apex B is smaller than the Y coordinate of the apex C (step S702), the path for scanning the left edge is set as A→B→C and the path for scanning the right edge is set as A→C (step S703), and the Y coordinate of the apex C is set to the maximum value of the Y coordinate (step S704). On the other hand, in the event that the Y coordinate of the apex B is greater than the Y coordinate of the apex C, the path for scanning the left edge is set as A→B and the path for scanning the right edge is set as A→C→B (step S705), and the Y coordinate of the apex B is set to the maximum value of the Y coordinate (step S706).

The contents of such processing will be described in further detail with reference to FIGS. 16A through 16D. FIGS. 16A through 16D are diagrams describing methods for determining sides corresponding to the left and right edges and the drawing scanning range.

Figure 16A:
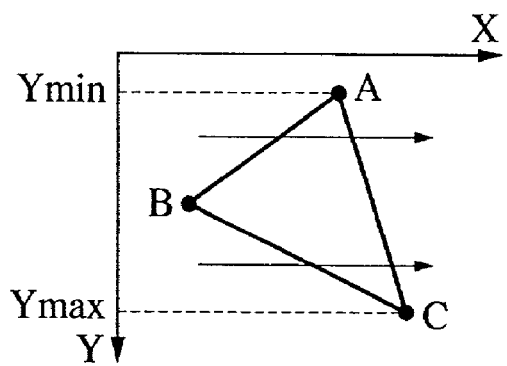
FIGS. 16A through 16D are diagrams describing methods for determining sides corresponding to the left and right edges and the drawing scanning range.

FIG. 16A illustrates a triangular gradation drawing area, with the apexes A, B, and C set by the processing in the above step S701. Determining of the left and right edges in the steps S703 and S705 is synonymous with classifying the sides making up the polygon into sides defining the left side edge and the right side edge in scanning by dividing the sides by a line segment connecting the apex with the maximum Y coordinate and the apex with the minimum Y coordinate. For example, in FIG. 16A, the line segment connecting the apex A (Ymin) and apex C (Ymax) of the triangle ABC classifies the sides into the set of sides AB and BC, and the side AC, with the sides AB and BC defining the left side edge of each scan and the side Ac defining the right side edge of each scan.

Figure 16B:
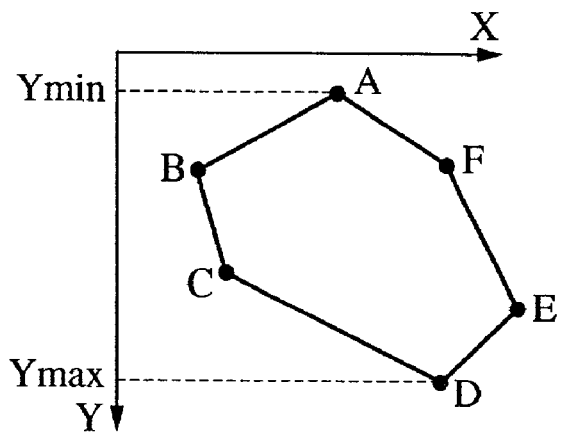

Now, in FIG. 16B, an example of a hexagon as another polygon is shown. This case also follows the above-described concept, with the sides being divided by a line segment connecting the apex A with the minimum Y coordinate and the apex D with the maximum Y coordinate. The sides AB, BC, and CD are set as sides defining the left side edge of each scan, and the sides AF, FE, and ED are set as sides defining the right side edge of each scan. Of course, the scanning range (Y-coordinate range) in the event of drawing a polygon in raster sequence is from the minimum value to the maximum value of the Y coordinates of all apexes (i.e., Ymin through Ymax).

Figure 16C:
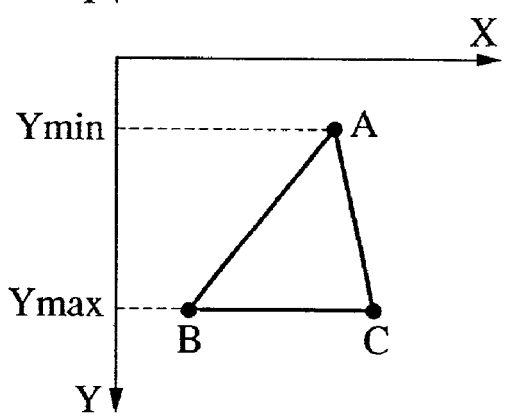

Also, as shown in FIG. 16C, in the event that a side parallel to the Y axis (side BC) exists, that side does not actually serve as a side defining either edge, and for the purpose of processing may belong to either the set for the left side edge or the set for the right side edge. With the present embodiment, in the event that Yb=Yc in step S702, the flow proceeds to step S703, so such sides are handled as sides defining the left edge.

Figure 16D:
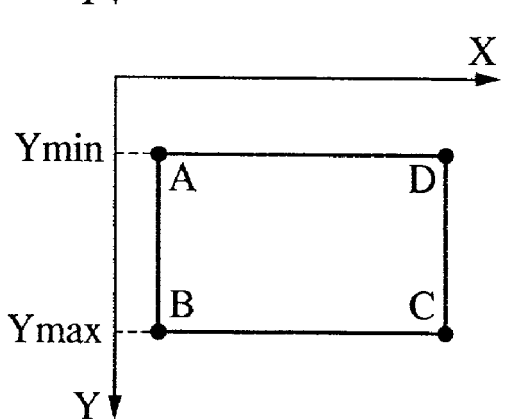

Also, as shown in FIG. 16D, in the event that the gradation drawing area is a rectangle with the sides thereof parallel to the X and Y axes, the sides AB and CD are parallel to the Y axis, so the side AC is selected as the side defining the left edge, and the side BD is selected as the side defining the right edge.

Thus, once the path for scanning has been decided upon, the Y axis of the apex A (Ymin) is set as an initial value of the variable Y (step S707), and the processing in steps S708 and 713 (i.e., drawing of the gradation drawing area by raster sequence) is repeated until Y>Ymax holds in step S714.

Next, the processing of steps S708 and S713 will be described. First, the X coordinate Xleft of the left edge and the X coordinate Xright of the right edge with regard to Y coordinates are calculated (step S708). Next, the calculated Xleft is set to a variable X (step S709), and the color of the coordinates (X, Y) is calculated by the triangle gradation specification color calculating equations (step S710). The value of the calculated color is stored in the object memory 318. Following color calculating for the coordinates (X, Y), the thinning-out level mabiki is added to X (step S711), X and Xright are compared (step S712), and the processing in steps S710 through S712 are repeated until X is greater than Xright. Once creating gradation image for one scan line of Y coordinates is completed, Y is incremented (Step S713), Y and Ymax are compared (step S714), and the processing of steps S708 through S714 is repeated until Y is greater than Ymax.

As described above, skipping pixels for color calculation in step S711 by a predetermined value each (by the thinning-out level value) reduces the amount of calculations for color value calculation and improves processing efficiency, thereby reducing the amount of memory used for color data.

Figure 15:
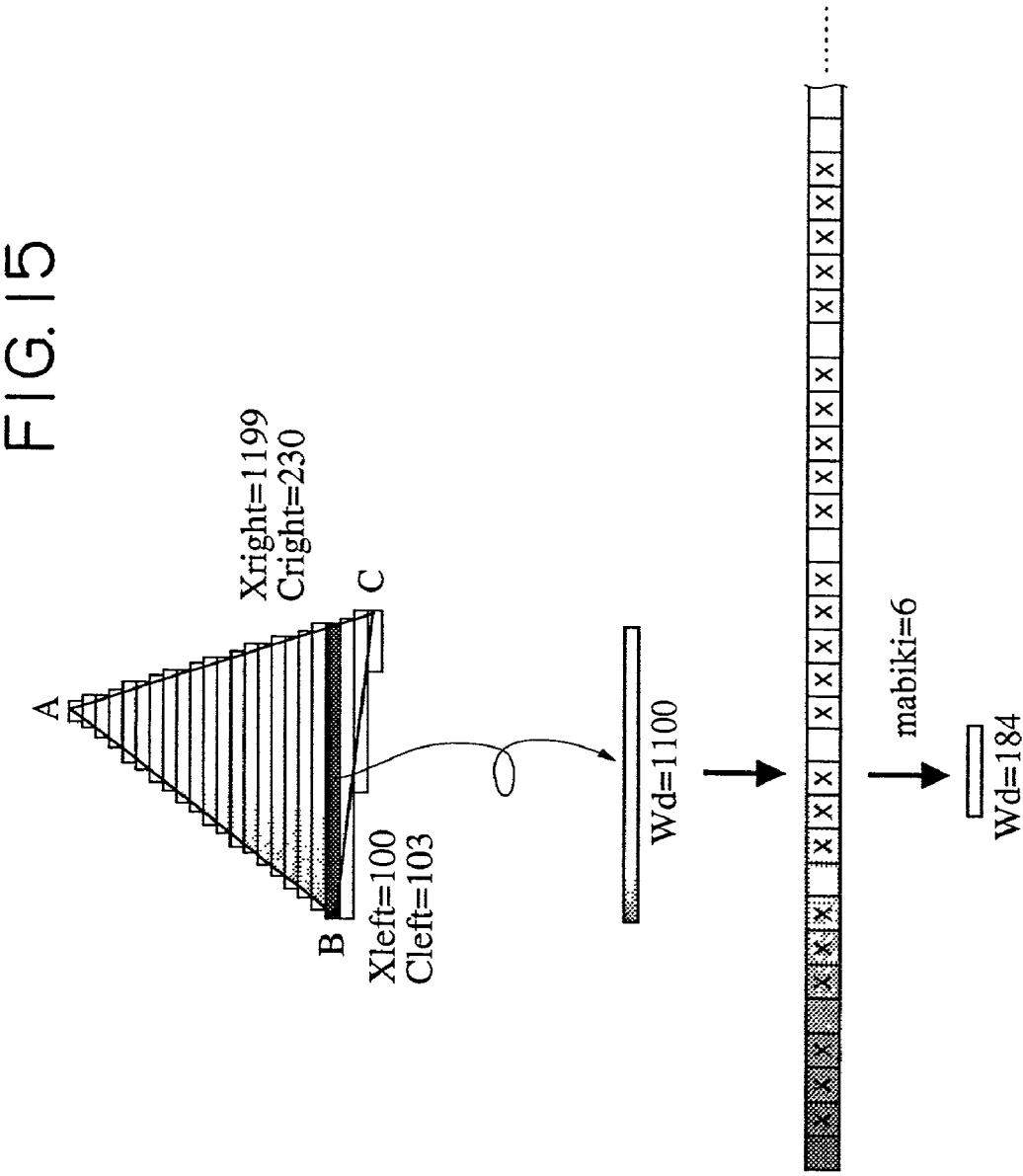
FIG. 15 is a diagram illustrating an example of creating scan line data at thinning-out level 6 according to the gradation image creating flowchart.

FIG. 12 illustrates an example of creating scan line data following he gradation image creating flowchart. In FIG. 12 the thinning-out level is 4, and it can be seen that the gradation drawing with width Wd=1,100 for example is reduced to Wd=275. In the same manner, in FIG. 15 the thinning-out level is 6, and it can be seen that the partial gradation drawing width Wd=1,100 for example is reduced to Wd=184.

As described above, according to the first embodiment, the intervals between pixels for calculating color values within the gradation drawing area are determined taking into consideration the degree of change of color within the gradation drawing area, and the colors within the gradation drawing area are calculated according to the determined pixel intervals. Using such a technique reduces the amount of time for calculating colors of the gradation drawing area while avoiding marked reduction in image quality, and also allows the amount of memory used to be reduced, so deterioration in performance due to gradation drawing processing can be avoided.

Second Embodiment

With the first embodiment, in the event that the gradation drawing area is a triangle, the thinning-out level is calculated by the width and number of colors of a rectangle area containing the triangular gradation area. With the second embodiment, the precision of calculating the thinning-out level is further improved with regard to the triangular gradation area, thereby creating a gradation image by a suitable thinning-out level.

Figure 13:
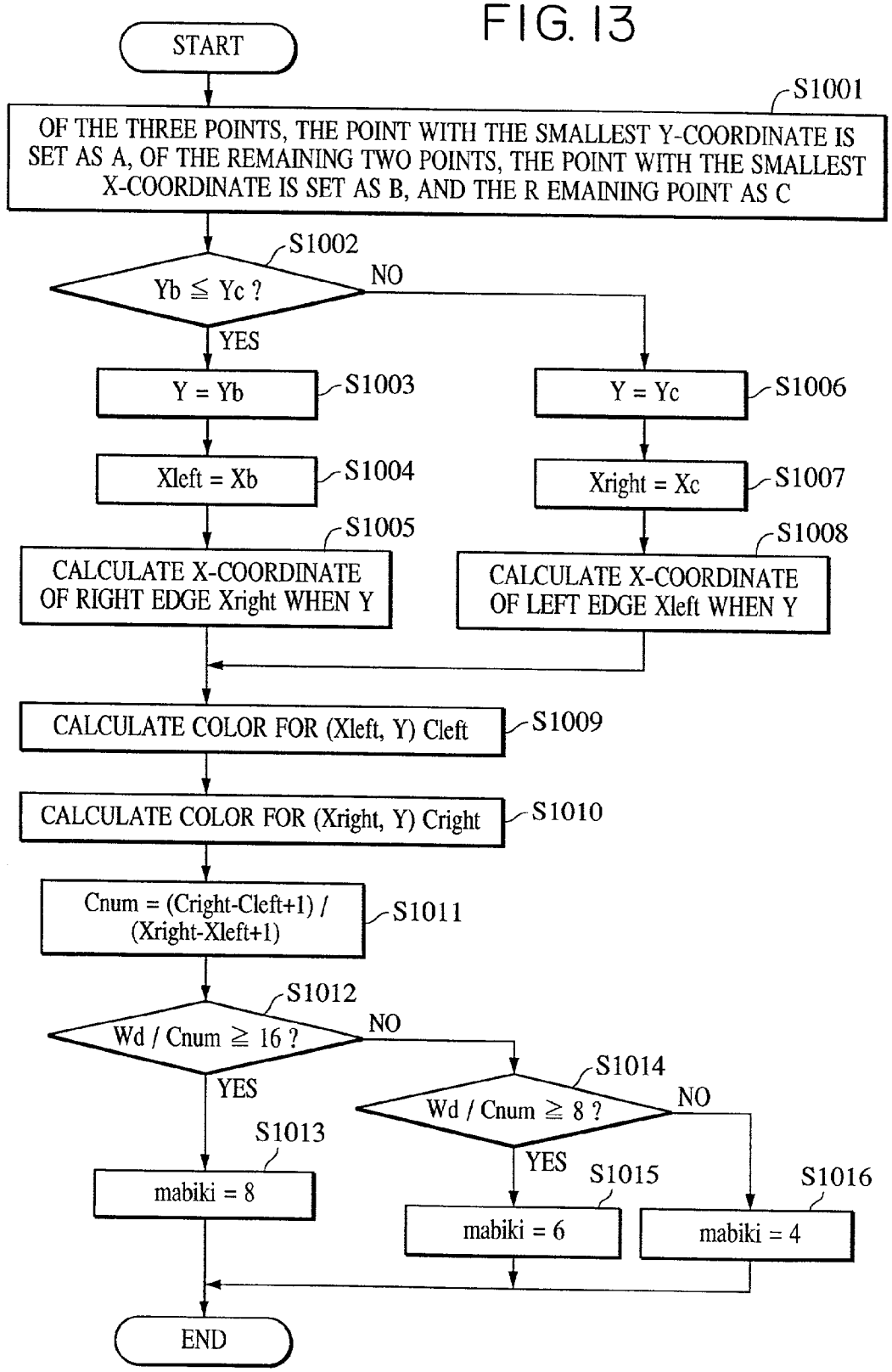
FIG. 13 is a flowchart illustrating detailed processing of the thinning-out level calculation (step S504) according to a second embodiment.

FIG. 13 is a flowchart illustrating the detailed processing of the thinning-out level calculation (step S504) according to the second embodiment.

The apex at the smallest Y coordinate of the three points for triangular gradation specification is set as A, the apex at the smallest X coordinate of the remaining two points is set as B, and the remaining apex is set as C (step S1001). In the event that the Y coordinate Yb of the apex B is equal to or smaller than the Y coordinate Yc of the apex C (step S1002), the Y coordinate Yb of the apex B is set to Y (step S1003), The X coordinate Xb of the apex B is set to Xleft (step S1004), and further the coordinates of the right edge in the event that the Y coordinate is Yb is calculated on a line connecting the apex A and apex C, which is set to Xright (step S1005).

On the other hand, in the event that the Y coordinate Yb of the apex B is greater than the Y coordinate Yc of the apex C, the Y coordinate Yc of the apex C is set to Y (step S1006), The X coordinate Xc of the apex C is set to Xright (step S1007), and further the coordinates of the left edge in the event that the Y coordinate is Yc is calculated on a line connecting the apex A and apex B, which is set to Xleft (step S1008).

Following setting Xleft, Xrigth, and Y thus, the color Cleft at the left edge (Xleft, Y) and the color Cright at the right edge (Xright, Y) are calculated (steps S1009 and S1010), and the width Wd and number of colors Cnum between Xleft and Xright are calculated (step S1011). The equations for calculating the width Wd and number of colors Cnum are as follows. That is, with Cleft as (Rleft, Gleft, Bleft), and Cright as (Rright, Gright, Bright), the width Wd is calculated by $$Wd = Xright - Xleft + 1$$

and the number of colors Cnum is calculated by $$R = abs(Rleft - Rright) + 1$$

$$G = abs(Gleft - Gright) + 1$$

$$B = abs(Bleft - Bright) + 1$$

$$Cnum = max(R, G, B)$$

wherein abs represents an absolute value.

Note that in the event that this is grayscale (monotone), the difference between the grayscale values (brightness value) is taken (Cleft−Cright+1) for the number of colors Cnum.

In the event that Wd/Cnum of the Wd and Cnum obtained by the equations is 16 or greater, the thinning-out level mabiki is set at 8 (steps S1012 and S1013), in the event that Wd/Cnum is 8 or greater but less than 16, the thinning-out level mabiki is set at 6 (steps S1012, S1014, and S1015), and in the event that Wd/Cnum is less than 8, the thinning-out level mabiki is set at 4 (steps S1012, S1014, and S1016). Gradation image data is created as described with the first embodiment according to the thinning-out level calculated by the above-described method.

Figure 14:
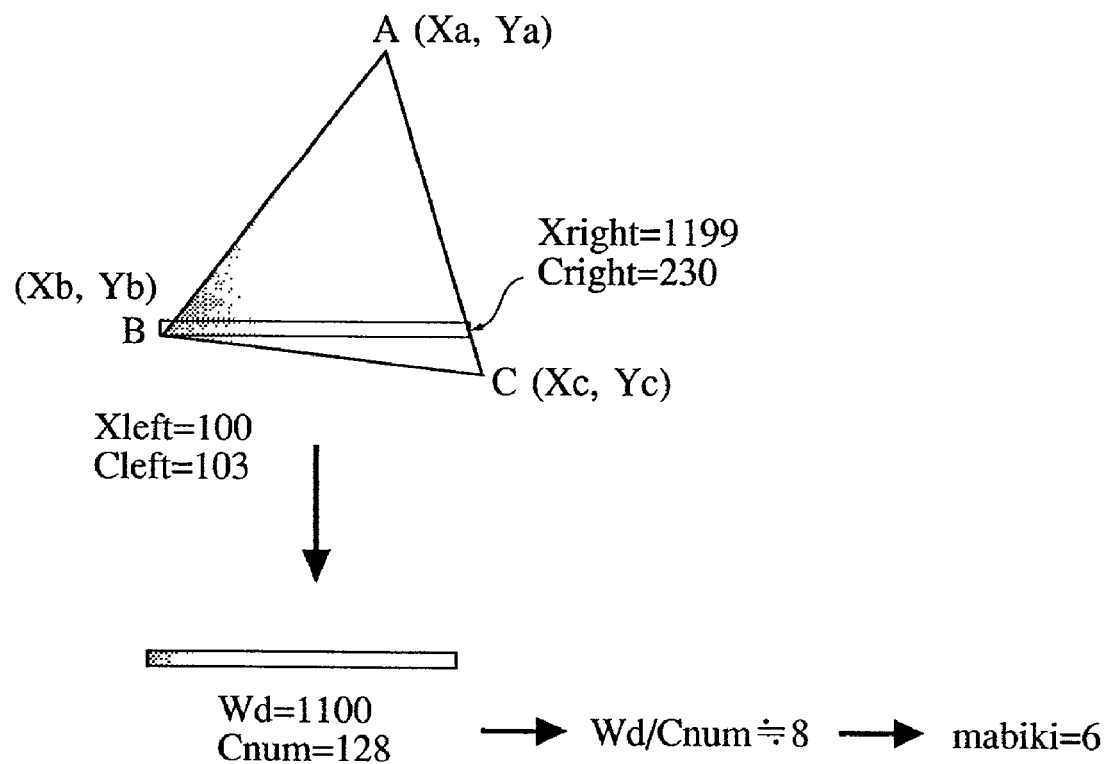
FIG. 14 is a diagram describing an example of calculating the thinning-out level according to the thinning-out level calculating flowchart according to the second embodiment.

FIG. 14 is a diagram describing an example of calculating the thinning-out level following the thinning-out level calculating flowchart according to the second embodiment. Here, Yb<Yc holds, so the X coordinate of the apex B is set at Xleft (=100), and the color of that point is set to Cleft (=103). Also, the X coordinate of a point on the side AC in the event that Y=Yb is set to Xright (=1199), and the color of that point is set to Cright (=230). Then, mabiki=6 is obtained by the processing in steps S1011 through S1016.

As described above, with the second embodiment, the thinning-out level is determined based on the change of color at the part of the gradation drawing area which has the longest scanning range for gradation drawing, so the precision of the thinning-out level settings is improved.

Though description has been made with the second embodiment regarding a triangular gradation drawing area, all that is necessary is to detect the maximum position of the scanning width and obtain the degree in change of color at that scanning portion even in the event that the drawing area is a polygon other than a triangle, so the concept of the present embodiment is applicable to polygons in general.

Also, though the thinning-out level calculating equations according to the first and second embodiments yield three types of thinning-out levels, i.e., 4, 6, and 8, but arrangements may be made wherein the conditions made more specific for dividing into a greater number of levels, to calculate more suitable thinning-out levels.

Also, though the thinning-out level calculating methods according to the first and second embodiments, calculate the thinning-out level based only on size and number of colors, more specific thinning-out levels may be calculated taking into other setting conditions which affect the image quality, such as output resolution, output gradients, and so forth. An example would be to use the thinning-out levels 8, 6, and 4 as described in the embodiments in the event that the output resolution is 600 dpi, and to use thinning-out levels 4, 2, and 1 in the event that the output resolution is 300 dpi. This can prevent deterioration in image quality due to performing thinning-out at the same level on images with low resolution.

Figure 6:
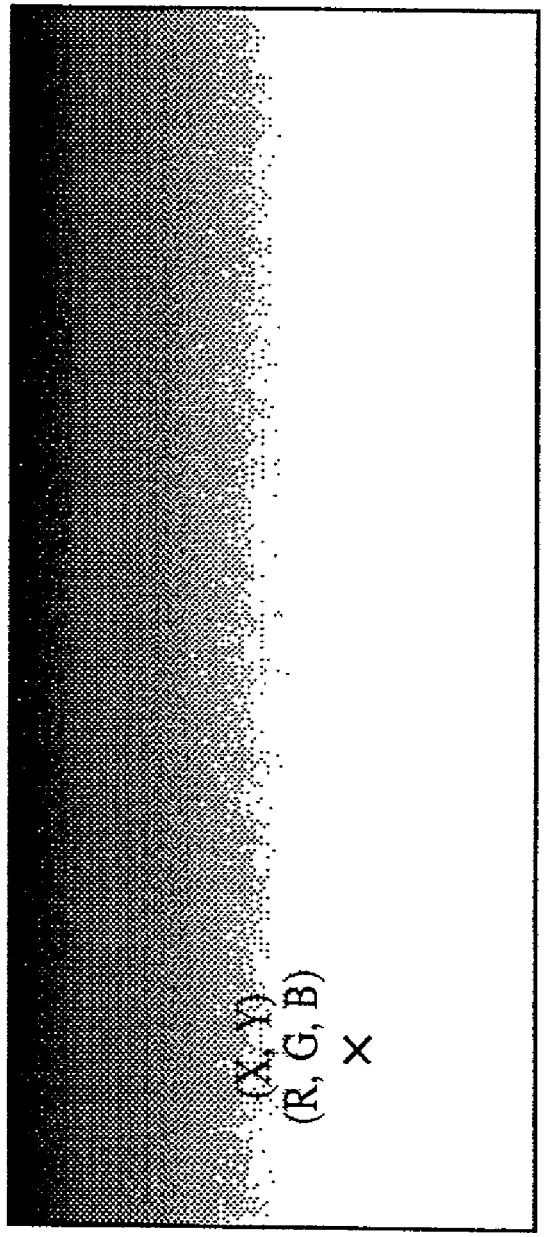
FIG. 6 is a diagram describing vertical gradation drawing.
Figure 7:
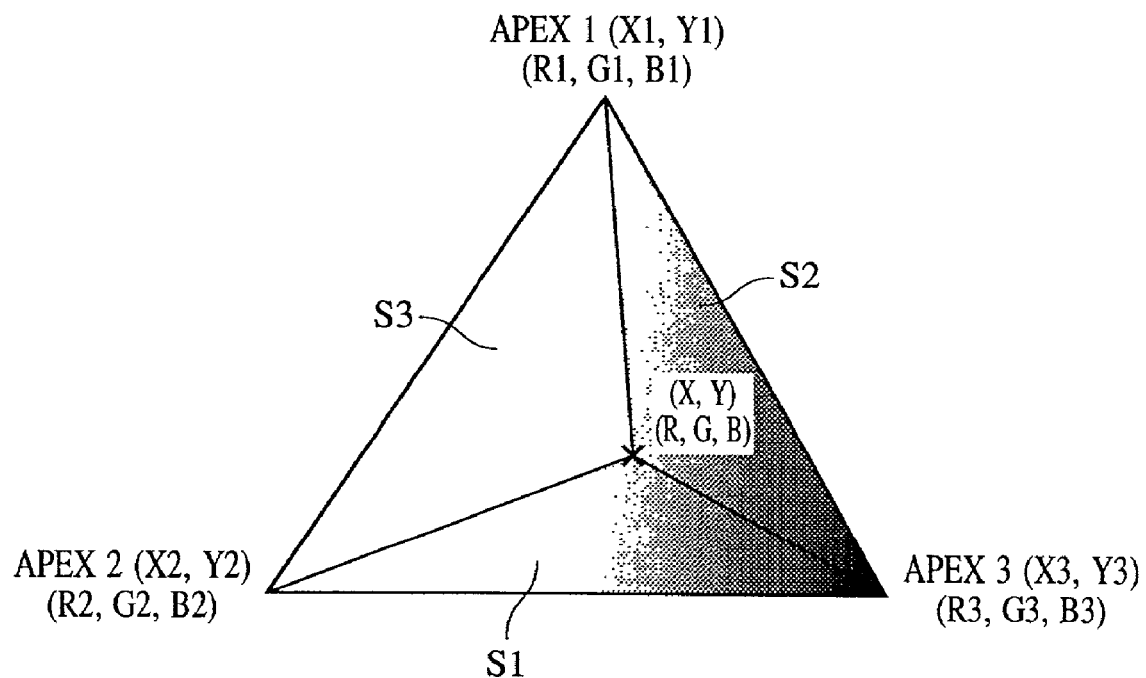
FIG. 7 is a diagram describing triangular gradation drawing.

Further, though the first and second embodiments describe applying thinning-out level calculation and gradation image drawing only in the main scanning direction, but these may be applied to the sub-scanning direction as well, by similar method. In this case, the value of the variable Y increases according to the thinning-out level in step S713. Now, the thinning-out level calculations and application of gradation image drawing to the sub-scanning direction using these will be apparent to any skilled in the art, so further description thereof will be omitted, but it should be noted that advantages the same as those for horizontal gradation drawing in the above embodiments can be obtained for vertical gradation drawing such as shown in FIG. 6, by such application.

Further, the above embodiments have been described with gradation drawing being performed at the printer controller side, by the present embodiments can be applied to performing gradation drawing at the host computer side, as well. That is to say, calculating the thinning-out level at the host computer side and performing gradation drawing accordingly yields a gradation drawing reduced at the thinning-out level, so the reduced gradation drawing and the thinning-out level are supplied to the printer controller. The printer controller side enlarges the transmitted gradation drawing according to the thinning-out level, and outputs the image. Thus, a reduced image can be transmitted for gradation drawing, so the mount of transmission data can be reduced, thereby preventing deterioration of throughput.

As described above, with the gradation drawing according to the above embodiments, the intervals of pixels for calculation are determined taking into consideration the gradation drawing area and the number of colors within the area, and the colors are calculated at the pixel intervals calculated within the gradation drawing area, thereby enabling the amount of time for calculating colors within the gradation drawing area to be reduced while avoiding marked deterioration of image quality, and also reducing the amount of memory used, thereby avoiding deterioration in performance.

Also, it is needless to say that the objects of the present invention can be achieved by an arrangement wherein a storing medium storing software program code for realizing the functions of the above embodiments is supplied to a system or device, and the program code stored in the storing medium is read out and executed by the computer (or CPu or MPU) of the system or device.

In this case, the program code itself read out from the storing medium realizes the functions of the above-described embodiments, and the storing medium storing the program code comprises the present invention.

Examples of storing mediums which can be used for supplying the program code include floppy disks, hard disks, optical disks, magneto-optical disks, CD-ROMs, CD-Rs, magnetic tape, non-volatile memory cards, ROM, and so forth.

Also, it is needless to say that the present invention encompasses cases not only where the computer executing the program code read out realizes the functions of the above embodiments, but also where the operating system or the like running on the computer executes part or all of the actual processing based on the instructions of the program code, thereby realizing the functions of the above-described embodiments.

Further, it is needless to say that the scope of the present invention also encompasses arrangements wherein the program code read out from the storing medium is written to memory provided to function expansion boards inserted into the computer or function expansion units connected to the computer, following which a CPU or the like provided to the function expansion board or function expansion unit performs all or part of the actual processing based on instructions of the program code, so as to realize the functions of the above embodiments thereby.

As described above, according to the present embodiments, gradation drawing processing can be carried out without causing deterioration of printing processing throughput, i.e., deterioration of printer engine performance.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing device, comprising:
   obtaining means for obtaining the degree of change of color within a gradation drawing area;
   determining means for determining a thinning-out level within said gradation drawing area, based on the degree of change of color obtained by said obtaining means; and calculating means for calculating the color value of pixels within said gradation drawing area at pixel intervals determined by said thinning-out level.

2. An image processing device according to claim 1, wherein said determining means determine said thinning-out level such that the smaller the degree of change of color obtaining by said obtaining means is, the greater the amount of thinning out is.

3. An image processing device according to claim 1, wherein said obtaining means obtains the degree of change of color based on the width of said gradation drawing area, and the number of colors within said gradation drawing area.

4. An image processing device according to claim 3, wherein the width of said gradation drawing area is the width of a smallest rectangular area contained within said gradation drawing area.

5. An image processing device according to claim 3, wherein, in the event of color output within said gradation drawing area, the greatest value of the difference between the maximum value and minimum value of the brightness value of each color component within said area serves as the number of colors.

6. An image processing device according to claim 3, wherein, in the event that said gradation drawing area is to be output in monotone grayscale, the difference between the maximum brightness level and the minimum brightness level serves as the number of colors.

7. An image processing device according to claim 1, wherein said obtaining means obtains the degree of change of color for a part of said gradation drawing area which has the maximum scanning width.

8. An image processing method, comprising:
an obtaining step for obtaining the degree of change of color within a gradation drawing area;
a determining step for determining a thinning-out level within said gradation drawing area, based on the degree of change of color obtained in said obtaining step; and
a calculating step for calculating the color value of pixels within said gradation drawing area at pixel intervals determined by said thinning-out level.

9. An image processing method according to claim 8, wherein said thinning-out level is determined in said determining step such that the smaller the degree of change of color obtaining in said obtaining step is, the greater the amount of thinning out is.

10. An image processing method according to claim 8, wherein the degree of change of color is obtained in said obtaining step based on the width of said gradation drawing area, and the number of colors within said gradation drawing area.

11. An image processing method according to claim 10, wherein the width of said gradation drawing area is the width of a smallest rectangular area contained within said gradation drawing area.

12. An image processing method according to claim 10, wherein, in the event of color output within said gradation drawing area, the greatest value of the difference between the maximum value and minimum value of the brightness value of each color component within said area serves as the number of colors.

13. An image processing method according to claim 10, wherein, in the event that said gradation drawing area is to be output in monotone grayscale, the difference between the maximum brightness level and the minimum brightness level serves as the number of colors.

14. An image processing method according to claim 8, wherein the degree of change of color is obtained in said obtaining step for a part of said gradation drawing area which has the maximum scanning width.

15. An image forming device which performs rendering processing on analyzed data, said device comprising:
receiving means for receiving Page Description Language data created by external equipment;
data analyzing means for analyzing the received Page Description Language data;
drawing means for performing gradation drawing using an image processing method according to claim 8 in the event that gradation drawing is instructed by said data analyzing means; and
output means for outputting gradation drawing obtained by said drawing means in an enlarged manner based on said thinning-out level.

16. An image forming method, comprising:
a receiving step for receiving Page Description Language data created by external equipment;
a data analyzing step for analyzing the received Page Description Language data; and
a rendering processing step for performing rendering processing on analyzed data;
said rendering processing step comprising
a drawing step for performing gradation drawing using an image processing method according to claim 8 in the event that gradation drawing is instructed in said data analyzing step; and
an output step for outputting gradation drawing obtained in said drawing step in an enlarged manner based on said thinning-out level.

17. An information processing device for converting printing data created by an application into Page Description Language and outputting, said device comprising:
processing means for obtaining color values and thinning-out level within said gradation drawing area, obtained by an image processing method according to claim 8 with regard to the gradation drawing area; and
output means for outputting said color values and thinning-out level, obtained by said processing means, as data for said gradation drawing.

18. An information processing method for converting printing data created by an application into Page Description Language and outputting, said method comprising:
a processing step for obtaining color values and thinning-out level within said gradation drawing area, obtained by an image processing method according to claim 8 with regard to the gradation drawing area; and
an output step for outputting said color values and thinning-out level, obtained in said processing step, as data for said gradation drawing.

19. A recording medium storing a control program for realizing an image processing method according to claim 8 with a computer.

20. A control program for realizing an image processing method according to claim 8 with a computer.

* * * * *

UNITED STATES PATENT AND TRADEMARK OFFICE
CERTIFICATE OF CORRECTION

PATENT NO. : 7,072,073 B2
APPLICATION NO. : 10/015748
DATED : July 4, 2006
INVENTOR(S) : Takashi Ohno It is certified that error appears in the above-identified patent and that said Letters Patent is hereby corrected as shown below:

COLUMN 1:
Line 11, "present" should read -- the present --.

COLUMN 4:
Line 28, "the" should read -- the toner image is --.

COLUMN 5:
Line 11, "CPu" should read -- CPU --;
Line 30, "The DAM" should read -- The DMA --; and
Line 36, "and DAM" should read -- and DMA --.

COLUMN 8:
Line 52, "as judged to the" should read -- are judged to be --.

COLUMN 9:
Line 43, "three" should read -- the --.

COLUMN 12:
Line 35, "Xrigth," should read -- Xright, --.

COLUMN 13:
Line 25, "but" should be deleted;
Line 26, "made" should read -- are made --;
Line 32, "into" should read -- into account --;
Line 43, "but" should be deleted;
Line 54, "have" should read -- that have --;
Line 56, "by the present embodiments can be" should read -- show that gradation drawing performed at the printer controller side can, according to the present embodiments, be --; and

UNITED STATES PATENT AND TRADEMARK OFFICE
CERTIFICATE OF CORRECTION

PATENT NO. : 7,072,073 B2
APPLICATION NO. : 10/015748
DATED : July 4, 2006
INVENTOR(S) : Takashi Ohno It is certified that error appears in the above-identified patent and that said Letters Patent is hereby corrected as shown below:

<u>COLUMN 13</u>: (cont'd)
Line 66, "mount" should read -- amount --.

Signed and Sealed this

Fourteenth Day of August, 2007

JON W. DUDAS
*Director of the United States Patent and Trademark Office*